(No Model.)

A. F. THAYER.
PROCESS OF REMOVING BUTTERMILK FROM BUTTER.

No. 411,624. Patented Sept. 24, 1889.

WITNESSES.
J. M. Hartnett,
B. W. William

INVENTOR.
Albert F. Thayer
By his Atty.
Henry Williams

UNITED STATES PATENT OFFICE.

ALBERT F. THAYER, OF MAPLE HILL, KANSAS.

PROCESS OF REMOVING BUTTERMILK FROM BUTTER.

SPECIFICATION forming part of Letters Patent No. 411,624, dated September 24, 1889.

Application filed May 4, 1889. Serial No. 309,652. (No model.)

*To all whom it may concern:*

Be it known that I, ALBERT F. THAYER, of Maple Hill, in the county of Wabaunsee and State of Kansas, have invented new and useful Improvements in Separating Buttermilk from Butter; and I do hereby declare that the following is a full, clear, and exact description of the invention, which will enable others skilled in the art to which it appertains to make and use the same.

It is a well-known fact that a large proportion, perhaps nine-tenths, of the poor butter placed on sale is made so from the fact that the buttermilk contained therein is not properly and wholly worked out—a difficult and laborious process, now done mostly by hand.

It is the object of this invention to obviate this difficulty and to extract and separate the buttermilk from the butter.

In order that my process may be fully understood, I have illustrated in the accompanying drawings, in which similar letters of reference indicate like parts, an apparatus for carrying out the said process.

Figure 1:
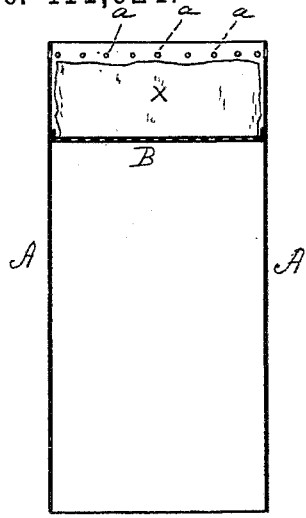
Figure 2:
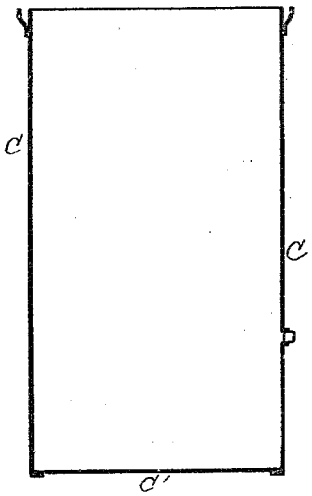
Figure 3:
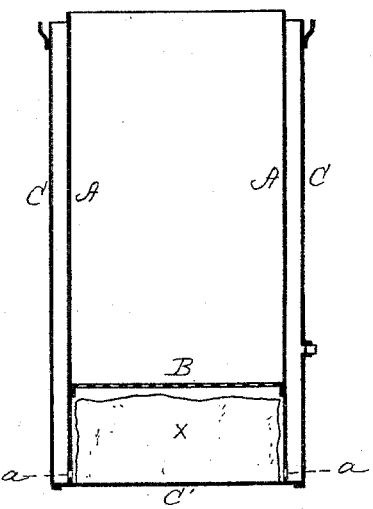
Figure 4:
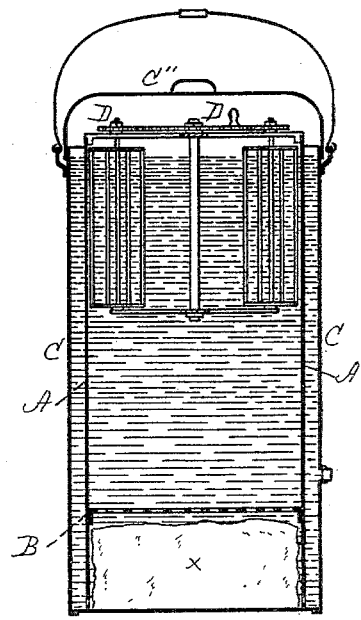

Figure 1 in said drawings is a vertical section of a vessel which I term a "separator," said vessel being shown in this figure as reversed, or placed upside down. Fig. 2 is a vertical section of a vessel somewhat larger in diameter, which I term a "cooler." Fig. 3 is a vertical section of the separator and cooler, the former inside the latter. Fig. 4 is a vertical section of the entire apparatus as below described.

To carry my process or invention into effect I take the butter after churning, and while still containing its buttermilk, and place it in a vessel—such as the separator A, for example—in which there is a perforated shelf or strainer B. This vessel, which is shown reversed in Fig. 1, is open at both ends and provided near its lower edge with perforations *a*. X in said figure represents the butter placed, as above mentioned, in said vessel. The separator A, with the butter X therein, is then reversed and placed within the vessel C, which is provided with a cover C″, and has a bottom C′, as shown in Fig. 3. The vessels are then filled with water, which is gradually heated until of a sufficient temperature to melt the butter X, which is below the strainer B. This water, by means of perforations *a*, flows freely from one vessel into the other. (See Fig. 4.)

The heated water melts the butter, which rises to the surface of the water, and as it is rising to said surface the buttermilk is released and is at once absorbed and assimilated by the water, leaving the butter perfectly sweet and pure and free from buttermilk. The water and butter are allowed to gradually cool and the butter when nearly cold is beaten or agitated by a beater, as D, which sets on the edge of the vessel A and is in contact with the butter, which is next the surface of the water, as above stated. This beating is continued while the butter is cooling until the butter is beaten to a fine froth, which when cool becomes hard. Thus the granulated condition of the butter when it rises to the surface of the water is changed into a firm and solid condition. By this process all the buttermilk is extracted and the texture of the butter, after the little water contained in it has been worked or pressed out, is fine and smooth, and the butter is pure and sweet.

It will be seen that the steps of this process are as follows: placing the butter in water near the bottom of a receptacle containing water, warming the water to melt the butter and cause it to rise to the surface, thus freeing it from the buttermilk, which is assimilated by the water, allowing the water to cool, and beating the butter into a froth to harden and solidify it.

Poor and rancid butter may be subjected to the above-described process, often with the best results.

Having thus fully described my invention, what I claim, and desire to secure by Letters Patent, is—

The process of separating buttermilk from butter, which consists in first melting butter under sufficiently warm water by holding said butter in bulk below the surface thereof, next allowing the butter to rise in a melted state through the water, whereby the buttermilk is absorbed thereby, and then beating the pure butter which has risen to the surface into a frothy substance, and finally allowing the said substance to cool, whereby it becomes non-granular and solid, substantially as set forth.

ALBERT F. THAYER.

Witnesses:
   J. W. THURSTON,
   ALFRED G. BASS.